US011364881B2

(12) United States Patent
Kim et al.

(10) Patent No.: US 11,364,881 B2
(45) Date of Patent: Jun. 21, 2022

(54) ORGAN TYPE ELECTRONIC BRAKE PEDAL APPARATUS

(71) Applicants: HYUNDAI MOTOR COMPANY, Seoul (KR); KIA CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA CORPORATION, Seoul (KR); KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 17/325,807

(22) Filed: May 20, 2021

(65) Prior Publication Data

US 2022/0144222 A1 May 12, 2022

(30) Foreign Application Priority Data

Nov. 6, 2020 (KR) .......................... 10-2020-0147720

(51) Int. Cl.
*G05G 1/30* (2008.04)
*B60T 7/04* (2006.01)
*B60T 7/06* (2006.01)

(52) U.S. Cl.
CPC ................ *B60T 7/042* (2013.01); *B60T 7/06* (2013.01)

(58) Field of Classification Search
CPC .... B60T 7/04; B60T 7/06; G05G 1/30; G05G 1/38; G05G 1/44; G05G 1/445; B60K 26/021
See application file for complete search history.

(56) References Cited

U.S. PATENT DOCUMENTS 6,318,208 B1 * 11/2001 Thongs, Jr. .............. G05G 1/38
74/513
10,401,896 B1 * 9/2019 Kim ......................... G05G 1/44
(Continued)

FOREIGN PATENT DOCUMENTS

DE 102015214634 A1 * 2/2017 ............. B60K 23/02
GB 360042 A * 8/1931 ............... G05G 1/30
(Continued)

OTHER PUBLICATIONS

Machine Translation of DE 10 2015 214 634.*
Machine Translation of WO 2020/254368.*

*Primary Examiner* — Richard W Ridley
*Assistant Examiner* — Brian J McGovern
(74) *Attorney, Agent, or Firm* — Lempia Summerfield Katz LLC (57) ABSTRACT

An organ type electronic brake pedal apparatus having a high-load spring module and a hysteresis module is capable of tuning a pedal effort, a stroke and a hysteresis operation force, desired differently for each vehicle model, by changing a component of the high-load spring module or hysteresis module. In particular, the organ type electronic brake pedal apparatus includes: a pedal housing to be fixedly installed on a floor below a driver seat of a vehicle; a pedal pad pivotably coupled to the pedal housing to be operated by a driver of the vehicle; a high-load spring module including a first end and a second end pivotably coupled to the pedal housing and the pedal pad, respectively; and a hysteresis module to connect the pedal housing and the pedal pad and generate hysteresis when the pedal pad is operated by the driver.

14 Claims, 8 Drawing Sheets

(56) References Cited

U.S. PATENT DOCUMENTS

| | | | |
|---|---|---|---|
| 10,946,741 B1* | 3/2021 | Kim | B60T 7/06 |
| 10,994,611 B1* | 5/2021 | Kim | G05G 5/28 |
| 11,021,058 B1* | 6/2021 | Kim | G05G 1/38 |
| 11,249,506 B1* | 2/2022 | Kim | B60T 7/042 |
| 2004/0045393 A1* | 3/2004 | DeForest | G05G 1/30 74/514 |
| 2007/0157755 A1* | 7/2007 | Kim | G05G 1/483 74/513 |
| 2011/0094331 A1* | 4/2011 | Kim | G05G 1/30 74/513 |
| 2011/0197700 A1* | 8/2011 | O'Neill | G05G 1/30 74/512 |
| 2012/0216652 A1* | 8/2012 | Yamazaki | G05G 1/30 74/513 |
| 2013/0087009 A1* | 4/2013 | Stewart | G05G 1/44 74/560 |
| 2019/0278318 A1* | 9/2019 | Park | G05G 5/03 |
| 2020/0001711 A1* | 1/2020 | Burke | G05G 5/05 |
| 2020/0293079 A1* | 9/2020 | Kang | G05G 1/38 |
| 2022/0009349 A1* | 1/2022 | Nagashima | G05G 1/38 |
| 2022/0048384 A1* | 2/2022 | Kim | G05G 1/42 |
| 2022/0055477 A1* | 2/2022 | Kim | B60K 26/021 |

FOREIGN PATENT DOCUMENTS

| | | | | |
|---|---|---|---|---|
| KR | 10-2020-0070946 A | 6/2020 | | |
| WO | WO-2020180141 A1 * | 9/2020 | | G05G 1/30 |
| WO | WO-2020254368 A1 * | 12/2020 | | G05G 5/03 |

\* cited by examiner

ORGAN TYPE ELECTRONIC BRAKE PEDAL APPARATUS

CROSS REFERENCE TO RELATED APPLICATION

This application claims priority to and the benefit of Korean Patent Application No. 10-2020-0147720, filed on Nov. 6, 2020, the entire contents of which are incorporated herein by reference.

FIELD

The present disclosure relates to an organ type electronic brake pedal apparatus, and more particularly, to an organ type electronic brake pedal apparatus capable of tuning a pedal effort, a stroke and a hysteresis operation force.

BACKGROUND

The statements in this section merely provide background information related to the present disclosure and may not constitute prior art.

In general, a brake pedal apparatus of a vehicle may be divided into a pendant type in which a pedal pad is suspended from a dash panel and an organ type in which a pedal pad is installed on a floor panel, based on its mounting structure.

In the pendant type, the pedal pad may have a pivot center on its upper portion, and a driver may thus operate the pedal pad by using a front part of his/her foot to step on a lower portion of the pedal pad or push the pedal pad forward. In the organ type, the pedal pad may have a pivot center on its lower portion, and a driver may operate the pedal pad by allowing an upper portion of the pedal pad to be pivoted forward.

The organ type brake pedal apparatus may have the pedal pad having a large area that the driver steps on and having a movement of which trajectory is similar to that of the driver's foot, and the driver may thus more smoothly operate the apparatus. Accordingly, the driver may more comfortably operate the organ type brake pedal apparatus than the pendant-type brake pedal apparatus.

However, we have discovered that the organ type brake pedal apparatus currently used fails to effectively respond to a pedal effort, a stroke or a hysteresis operation force, required differently for each vehicle model. Accordingly, the entire brake pedal apparatus has to be newly manufactured whenever necessary, which requires excessive investment.

The contents described as the related art have been provided only for assisting in the understanding for the background of the present disclosure and should not be considered as corresponding to the related art known to those skilled in the art.

SUMMARY

The present disclosure provides an organ type electronic brake pedal apparatus having a high-load spring module and a hysteresis module, and capable of tuning a pedal effort, a stroke and a hysteresis operation force, required differently for each vehicle model, by changing a component of the high-load spring module or hysteresis module, thereby having a reduced cost.

According to one form of the present disclosure, an organ type electronic brake pedal apparatus includes: a pedal housing fixedly installed on a floor of a vehicle; a pedal pad pivotably coupled to the pedal housing by a hinge pin in forward and backward directions, and operated by the driver; a high-load spring module having opposite ends pivotably coupled to the pedal housing and the pedal pad, respectively; and a hysteresis module installed to connect the pedal housing and the pedal pad with each other, and generating hysteresis when the pedal pad is operated by the driver.

The organ type electronic brake pedal apparatus may further include a plurality of pedal sensors fixedly installed in the pedal housing, connected to the pedal pad, and each generating a signal related to vehicle braking when the pedal pad is pivoted.

The pedal pad may include: a box-shaped pad portion having a pad surface operated by the driver's foot, and pivotably coupled to a first end of the high-load spring module; and a pedal arm portion having an upper end connected to the pad portion and a lower end coupled to the hinge pin, and connected to the pedal sensor. In one form, the box-shaped pad portion includes an opening open in a forward direction, and the first end of the high-load spring module is inserted through the opening of the box-shaped pad portion.

A sensor pin may be coupled to the pedal arm portion above the hinge pin, and coupled to a sensor lever of the pedal sensor.

The pad portion may pass through a housing hole formed in the pedal housing to be inserted into or protrude from the pedal housing as the pedal pad is pivoted; and the pedal arm portion may always be positioned in the pedal housing whether or not the pedal pad is pivoted.

The organ type electronic brake pedal apparatus may further include a stroke damper positioned on the high-load spring module, and regulating a stroke of the pedal pad when the high-load spring module is compressed as the pedal pad is pivoted forward.

The high-load spring module may include: a housing connection portion pivotably coupled to the pedal housing; a pad connection portion pivotably coupled to the pedal pad and moved together with the pedal pad; and a plurality of high-load springs connecting the housing connection portion and the pad connection portion with each other, and generating a pedal effort while being compressed when the pad connection portion is moved toward the housing connection portion.

The organ type electronic brake pedal apparatus may further include a stroke damper coupled to and surround the housing connection portion, and regulating a stroke of the pedal pad by being brought into contact with the pad connection portion when the pad connection portion is moved toward the housing connection portion while compressing the high-load spring as the pedal pad is pivoted.

The hysteresis module may include: a friction member fixed in the pedal housing and having a friction surface on its top end; a friction rod having a lower end in contact with the friction surface of the friction member and moved along the friction surface in a state of being in contact with the friction surface when the pedal pad is pivoted; a hysteresis damper fixed to the pedal pad; and a hysteresis spring having opposite ends installed to be respectively supported by the friction rod and the hysteresis damper.

The friction surface may be formed as a curved surface having an arc trajectory in the forward and backward directions, a backward end of the friction surface having the same trajectory as a pivoted radius centered on the hinge pin, and the arc trajectory of the friction surface being gradually greater than the pivoted radius, from the backward end of the friction surface toward the forward end thereof.

The friction rod may be formed by plastic injection and may be in frictional contact with the friction surface.

The friction rod, the hysteresis damper and the hysteresis spring may be connected in series with one another.

The friction member may have a connection protrusion protruding forward and upward from the forward end of the friction surface; and the connection protrusion may have a stroke protrusion regulating the stroke of the pedal pad by being brought into contact with the pedal pad pivoted forward.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific descriptions on structure and function of forms of the present disclosure described herein are merely illustrative. The forms may be implemented in various forms and the above descriptions are not construed to limit the present disclosure thereto.

The present disclosure may be variously modified and have several exemplary forms, and specific exemplary forms will thus be shown in the accompanying drawings and be described in detail. However, it is to be understood that the present disclosure is not limited to the specific exemplary forms, and includes all modifications, equivalents and substitutions included in the spirit and the scope of the present disclosure.

Terms such as 'first', 'second', etc., may be used to describe various components, and the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, should be similarly interpreted.

Terms used in the present specification are used only in order to describe specific exemplary forms rather than limiting the present disclosure. Singular forms used herein are intended to include plural forms unless explicitly indicated otherwise. It will be further understood that the terms "comprise" or "have" used in this specification, specify the presence of stated features, numerals, steps, operations, components, parts, or a combination thereof, and do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

A control unit (controller) according to an exemplary form of the present disclosure may be implemented by an algorithm configured to control operations of various components of a vehicle, a nonvolatile memory (not shown) configured to store data related to software instructions reproducing the algorithm, and a processor (not shown) configured to perform operations described below using the data stored in the memory. Here, the memory and the processor may be implemented as separate chips. Alternatively, the memory and the processor may be implemented as a single chip integrated with each other. The processor may be implemented as one or more processor chips.

Hereinafter, an organ type electronic brake pedal apparatus according to forms of the present disclosure is described with reference to the accompanying drawings.

As shown in FIGS. 1 to 7, an organ type electronic brake pedal apparatus according to one form of the present disclosure includes: a pedal housing 100 fixedly installed in a space below a driver seat of a vehicle; a pedal pad 300 pivotably coupled to the pedal housing 100 by a hinge pin 200 in forward and backward directions, and operated by a driver of the vehicle; a high-load spring module 400 having opposite ends pivotably coupled to the pedal housing 100 and the pedal pad 300, respectively; and a hysteresis module 500 installed to connect the pedal housing 100 and the pedal pad 300 with each other, and generating hysteresis when the pedal pad 300 is operated by the driver.

The pedal housing 100 may be formed in the shape of a box having an empty interior space, the high-load spring module 400, the hysteresis module 500 and pedal sensors to be described below may be installed in the interior space, and covers 110 may respectively be detachably coupled to its opposite sides.

The pedal pad 300 may include a pad surface 311 operated by the driver's foot, and the pad surface 311 may be spaced upward from the hinge pin 200. When the pedal pad 300 is pivoted backward centered on the hinge pin 200 and protrudes from the pedal housing 100, the pedal pad 300 may have a pulled-out structure in which only its portion where the pad surface 311 is positioned protrudes from the pedal housing 100 (see FIG. 2). Accordingly, it is impossible for the driver to step on the other portion of the pedal pad 300 except the pad surface 311.

The present disclosure may further include a plurality of pedal sensors 600 fixedly installed in the pedal housing 100, connected to the pedal pad 300, and each generating a signal related to vehicle braking when the pedal pad 300 is pivoted.

Each pedal sensor 600 may have a sensor lever 610 pivotably coupled thereto. The sensor lever 610 may be connected to a sensor pin 620 coupled to the pedal pad 300, and when the pedal pad 300 is pivoted relative to the pedal housing 100, the sensor lever 610 may be pivoted by the sensor pin 620.

In addition, a permanent magnet may be coupled to the sensor lever 610, a printed circuit board (PCB) may be positioned inside the pedal sensor 600 to face the permanent magnet, and the PCB may be electrically connected to a power supply apparatus such as a battery by a wire.

Therefore, the sensor lever 610 connected to the pedal pad 300 by the sensor pin 620 may be pivoted when the pedal pad 300 is pivoted relative to the pedal housing 100 as the driver operates the pedal pad 300 by stepping thereon. When the sensor lever 610 is pivoted, a position of the permanent magnet coupled to the sensor lever 610 may be changed, and the pedal sensor 600 may thus detect that the pedal pad 300 is operated (pivoted) by a change in a magnetic field strength based on a change in the pivoted position of the permanent magnet, thereby generating the signal related to the vehicle braking.

The pedal sensor 600 according to the present disclosure may be a contact type pedal sensor connected to the pedal pad 300 by a mechanical structure of the sensor lever 610, but may be a non-contact type pedal sensor including only the permanent magnet and the PCB, if desired.

In one form, the pedal pad 300 may include: a box-shaped pad portion 310 having the pad surface 311, and having one end of the high-load spring module 400 inserted thereinto and pivotably coupled thereto; and a pedal arm portion 320 having an upper end connected to the pad portion 310 and a lower end coupled to the hinge pin 200, and connected to the pedal sensor 600.

The pad portion 310 and the pedal arm portion 320 may be formed in an L shape when viewed from a side.

According to one form of the present disclosure, the sensor pin 620 may be coupled to the pedal arm portion 320 positioned between the pad portion 310 and the hinge pin 200, and the sensor pin 620 may be coupled to the sensor lever 610 of the pedal sensor 600.

As the sensor pin 620 is coupled to the pedal arm portion 320, it is possible to bring the pedal sensor 600 closer to the pedal arm portion 320, thereby reducing an overall size of the apparatus.

The pad portion 310 may have a structure in which only its forward portion into which the high-load spring module 400 is inserted is open, and all the other portions are sealed to prevent the inflow of a foreign material.

In the pedal pad 300, a lower end of the pedal arm portion 320 may be pivotably coupled to the pedal housing 100, centered on the hinge pin 200 in forward and backward directions. When the pedal arm portion 320 is pivoted forward, the pad portion 310 spaced upward from the hinge pin 200 may be inserted into the pedal housing 100 through a housing hole 120 formed in the pedal housing 100, and when the pedal arm portion 320 is pivoted backward, the pad portion 310 may be exposed by protruding from the pedal housing 100 backward, i.e. toward the driver.

The pad portion 310 may have its upper and lower surfaces each formed in an arc shape having the same trajectory as a pivoted radius of the pedal pad 300 centered on the hinge pin 200. Accordingly, the pad portion 310 may maintain a constant gap with the housing hole 120 formed in the pedal housing 100, thereby preventing the inflow of the foreign material as much as possible.

The pad portion 310 may be installed to pass through the housing hole 120 formed in the pedal housing 100 to be inserted into or protrude from the pedal housing 100 as the pedal pad 300 is pivoted; and the pedal arm portion 320 may always be positioned in the pedal housing 100 whether or not the pedal pad 300 is pivoted, thereby being blocked from contact with the driver.

Therefore, when operating the pedal pad 300 by stepping thereon, the driver may only operate the pad surface 311 of the pad portion 310 exposed from the pedal housing 100. The pedal arm portion 320 positioned in the pedal housing 100 may be blocked from contact with the driver's foot, and thus be impossible to be operated by the driver, thereby preventing its malfunction by the driver.

The high-load spring module 400 may have one end pivotably coupled to a forward surface of the pedal housing 100 by a first protrusion 411, and the other end inserted into the pad portion 310 and pivotably coupled to the pad portion 310 by a second protrusion 421.

The high-load spring module 400 may be installed to be positioned diagonally in a direction in which the pad portion 310 is moved.

That is, the high-load spring module 400 may include: a housing connection portion 410 pivotably coupled to the pedal housing 100; a pad connection portion 420 pivotably coupled to the pedal pad 300 and moved together with the pedal pad 300; and a plurality of high-load springs 430 connecting the housing connection portion 410 and the pad connection portion 420 with each other, and generating a pedal effort while being compressed when the pad connection portion 420 is moved toward the housing connection portion 410.

The first protrusion 411 may be positioned to protrude outward from a bottom end of the housing connection portion 410, and may be pivotably coupled to the pedal housing 100.

The second protrusion 421 may be positioned to protrude outward from a top end of the pad connection portion 420, and may be inserted into the pad portion 310 and pivotably coupled to the pad portion 310.

The housing connection portion 410 may have a guide hole 412 extending in a longitudinal direction, and the pad connection portion 420 may have a guide rod 422 inserted into the guide hole 412 and moved along the guide hole 412.

The high-load springs 430 may include three springs having different spring forces, and if one spring is damaged, the other unbroken springs may perform their functions.

The brake pedal of a vehicle may desire a high load for its differentiation from an accelerator pedal and safety during its operation, and to this end, one form according to the present disclosure may use the high-load spring module 400. One form may implement a desired pedal effort using the high-load spring module 400, and may thus use a low-capacity motor used in a general foldable accelerator pedal apparatus, thereby having a reduced cost.

It is possible to tune the pedal effort by using the high-load spring 430 having a different spring force based on a vehicle model.

The present disclosure may further include a stroke damper 700 positioned on the high-load spring module 400, and regulating a stroke of the pedal pad 300 when the high-load spring module 400 is compressed as the pedal pad 300 is pivoted forward.

That is, the stroke damper 700 may be coupled to and surround the housing connection portion 410 on the high-load spring module 400.

The stroke damper 700 may regulate the stroke of the pedal pad 300 as being brought into contact with the pad connection portion 420 when the pedal pad 300 is pivoted forward centering on the hinge pin 200 by the driver's operation, and the pad connection portion 420 is moved toward the housing connection portion 410 while compressing the high-load spring 430.

It is possible to tune the stroke of the pedal by using the stroke damper 700 having a different length based on the vehicle model.

The hysteresis module 500 according to one form of the present disclosure may include: a friction member 510 fixed in the pedal housing 100 and having a friction surface 511 on its top end; a friction rod 520 having a lower end in contact with the friction surface 511 of the friction member 510 and moved along the friction surface 511 in a state of being in contact with the friction surface 511 when the pedal pad 300 is pivoted; a hysteresis damper 530 fixed to the pedal pad 300; and a hysteresis spring 540 having opposite ends installed to be respectively supported by the friction rod 520 and the hysteresis damper 530.

The friction rod 520, the hysteresis damper 530 and the hysteresis spring 540 may be positioned in the pedal arm portion 320 of the pedal pad 300.

The friction surface 511 of the friction member 510 according to another form of the present disclosure may be formed as a curved surface having an arc trajectory in the forward and backward directions, a backward end of the friction surface 511 having the same trajectory as a pivoted radius R1 centered on the hinge pin 200, and an arc trajectory R2 of the friction surface 511 being gradually greater than the pivoted radius R1, from the backward end of the friction surface toward the forward end thereof. Accordingly, it is possible to differentiate a pedal effort when the driver operates the pedal pad 300 by stepping thereon from a pedal effort when the pedal pad 300 returns to its original position, thereby implementing pedal hysteresis.

According to another form of the present disclosure, the friction rod 520 of the hysteresis module 500 may be formed by plastic injection and may be in frictional contact with the friction surface 511, thereby implementing smooth hysteresis due to friction.

In some forms of the present disclosure, a hysteresis pedal effort may be implemented by a friction force of the friction surface 511, the friction rod 520 of the injection material and the hysteresis damper 530.

The friction surface 511 of the friction member 510 and the injected friction rod 520 may be in contact with each other to implement the friction force, and the hysteresis damper 530 made of rubber material may greatly generate a spring force of the hysteresis spring 540, thereby increasing the hysteresis pedal effort.

The rubber hysteresis damper 530 may have a larger elastic modulus than a regular spring, and thus increase the friction force by increasing its normal force. However, the rubber hysteresis damper 530 may have a longer recovery time than the regular spring.

Some forms of the present disclosure may provide a reliable return structure by connecting the friction rod 520, the hysteresis damper 530 and the hysteresis spring 540 in series with one another to increase the hysteresis power, and by greatly shortening the recovery time of the rubber hysteresis damper 530 using elasticity of the hysteresis spring 540.

It may be possible to tune the pedal effort or the hysteresis operation force by changing a shape of the friction surface 511 of the friction member 510, a hardness of the hysteresis damper 530 and a spring force of the hysteresis spring 540, based on the vehicle model.

Figure 1:
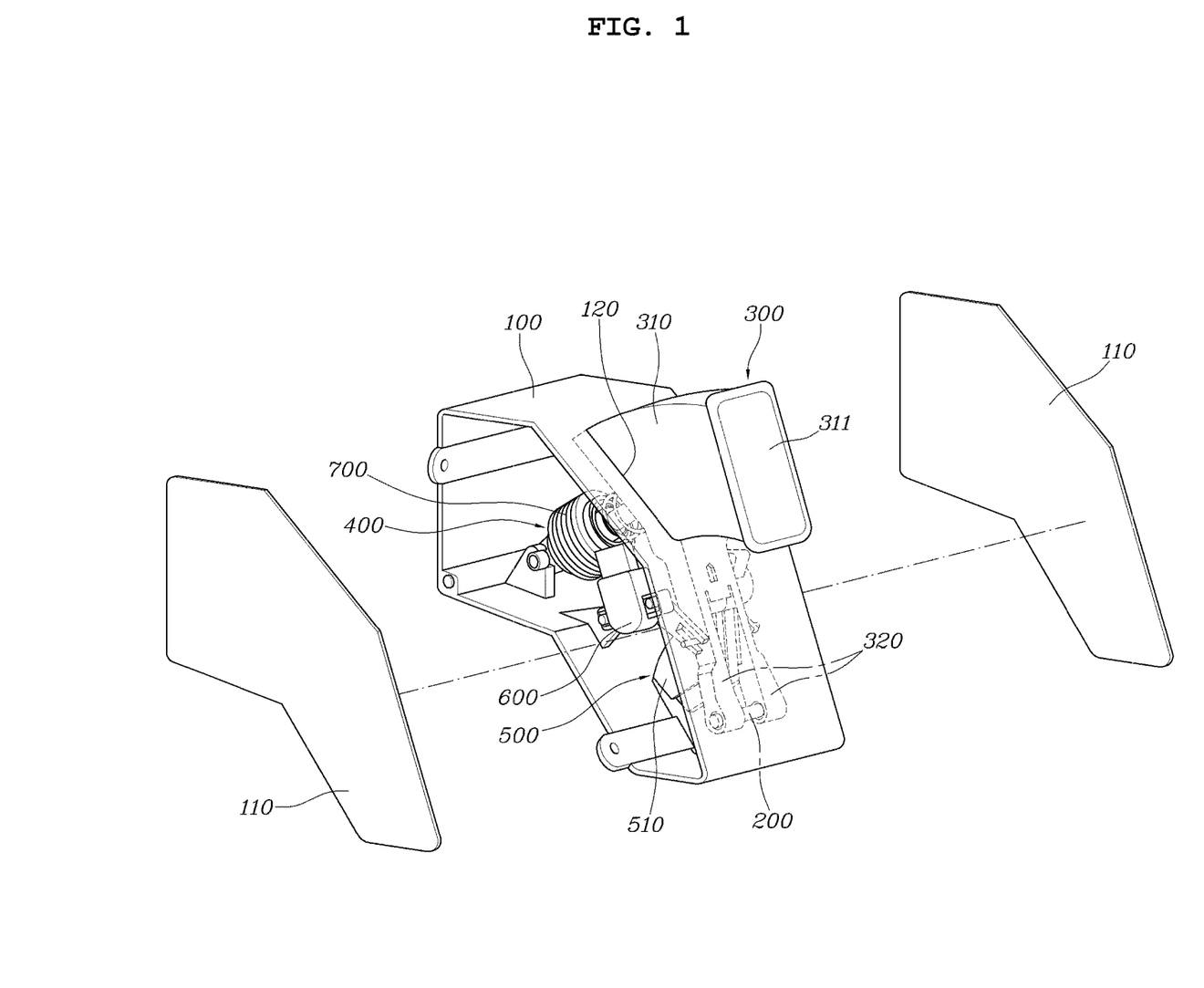
FIG. 1 is a view of an organ type electronic brake pedal apparatus according to one form of the present disclosure.
Figure 2:
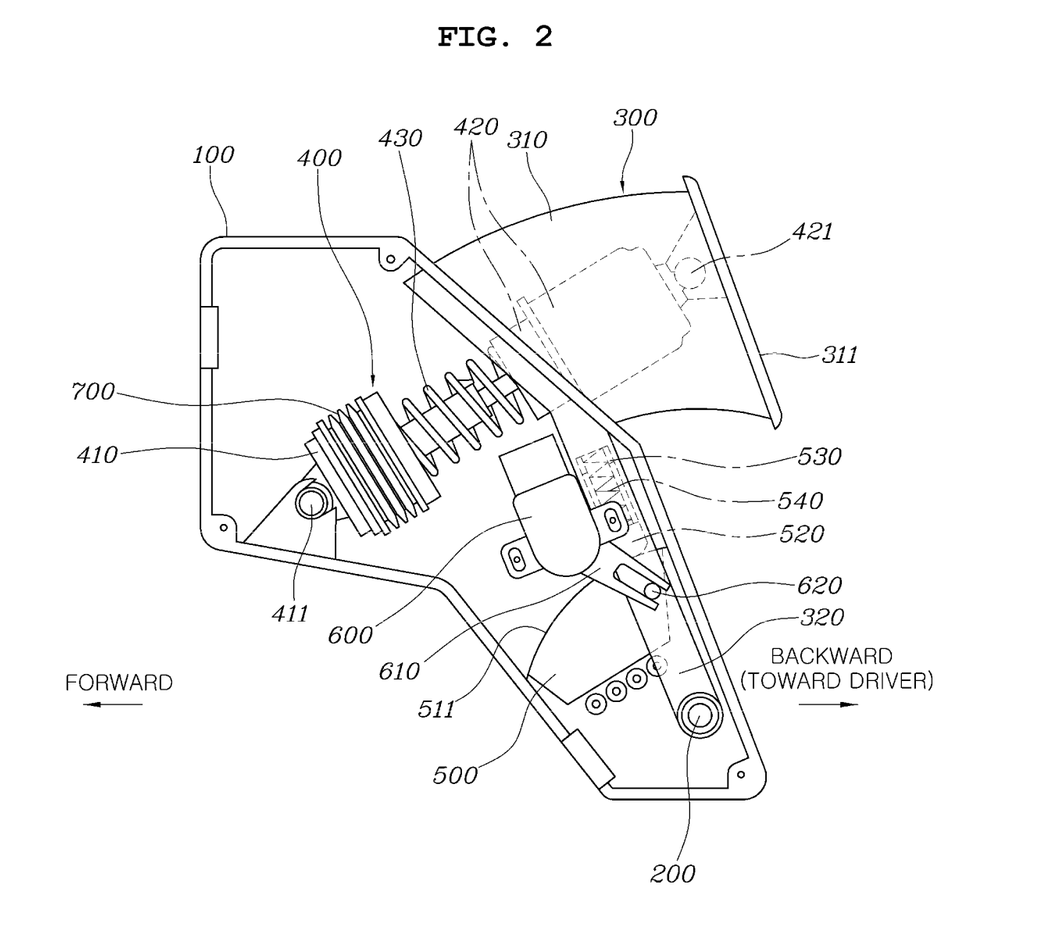
FIG. 2 is a side view of FIG. 1 in which a pad portion protrudes backward as a pedal pad is pivoted backward.
Figure 3:
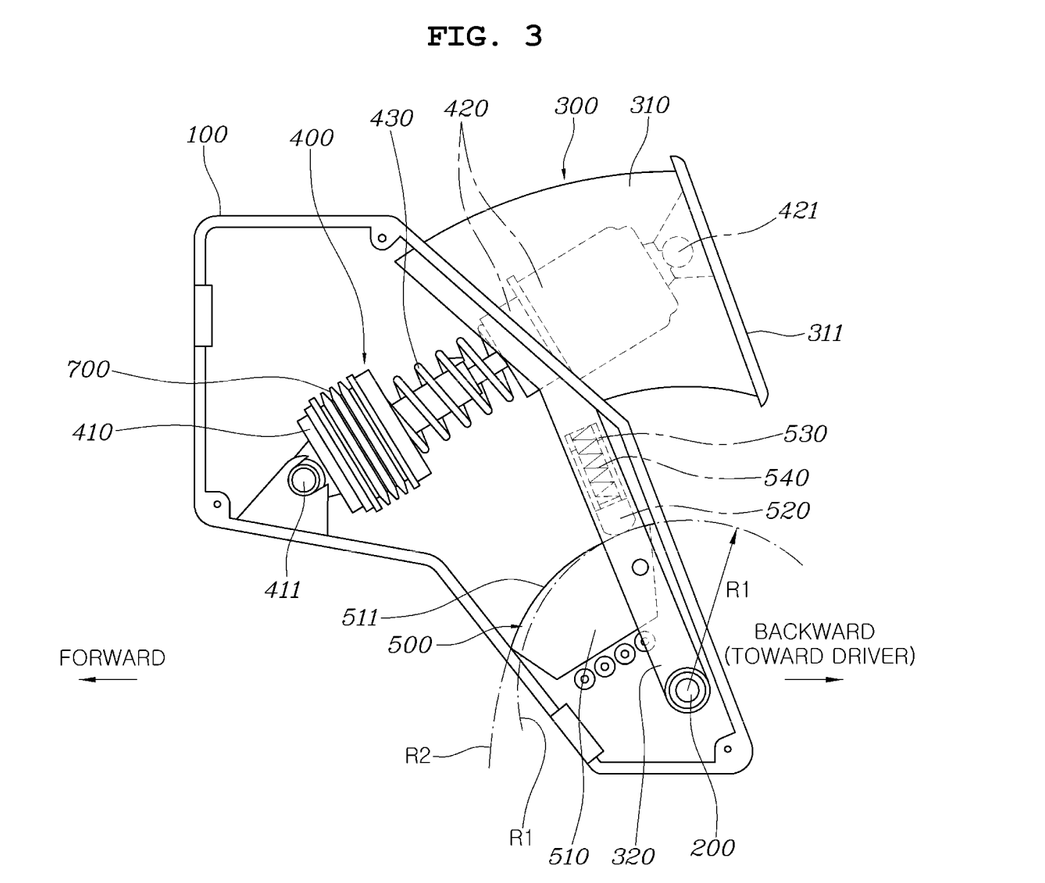
FIG. 3 is a view of a state in which a pedal sensor is removed from FIG. 2.
Figure 4:
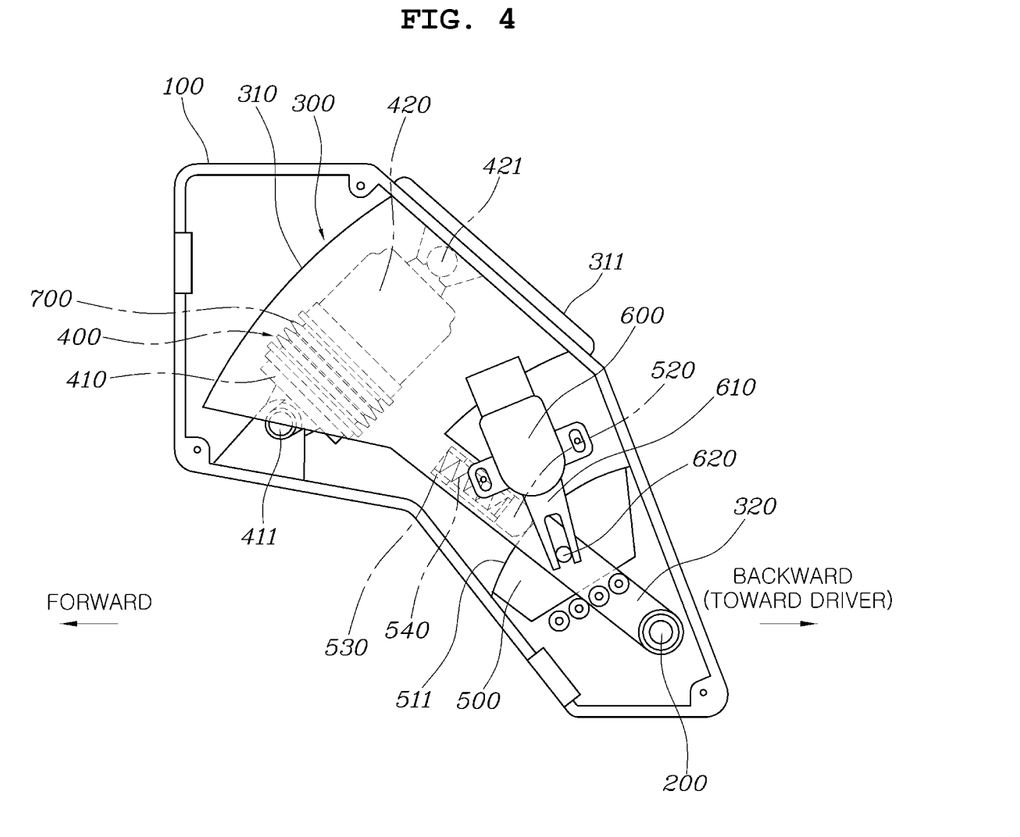
FIG. 4 is a view of a state in which the pad portion is inserted into a pedal housing as the pedal pad is pivoted forward in one form of the present disclosure.
Figure 5:
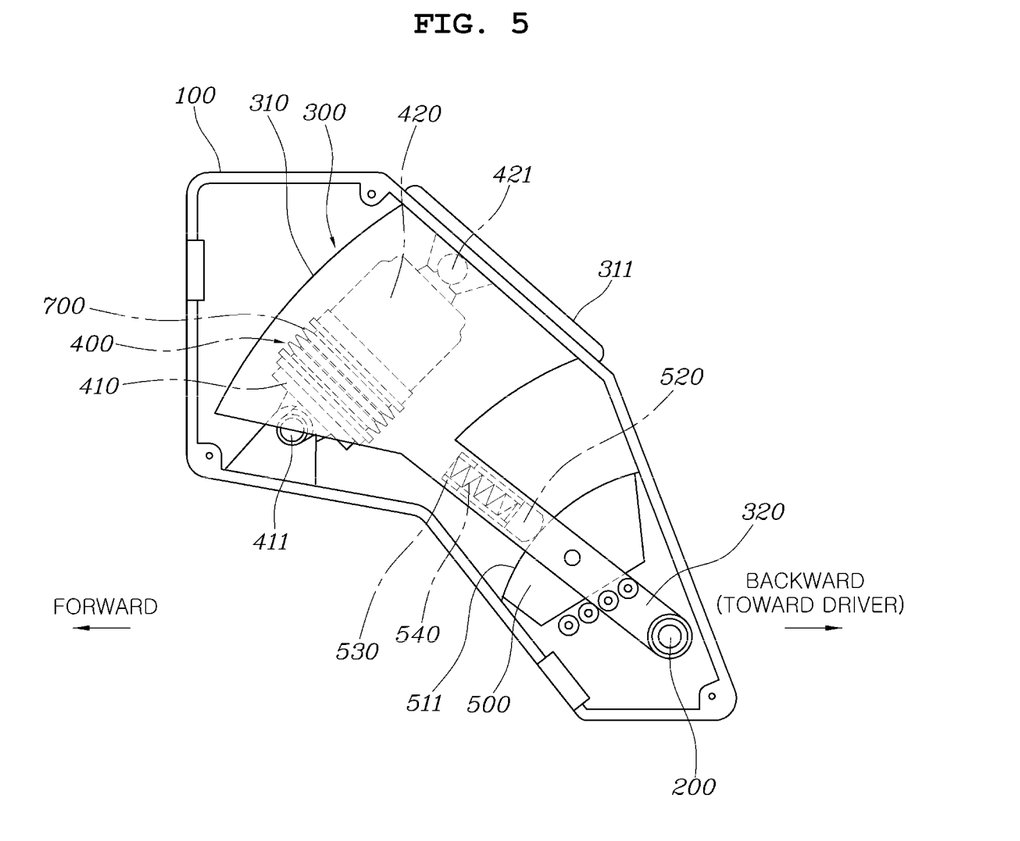
FIG. 5 is a view of a state in which the pedal sensor is removed from FIG. 4.
Figure 6:
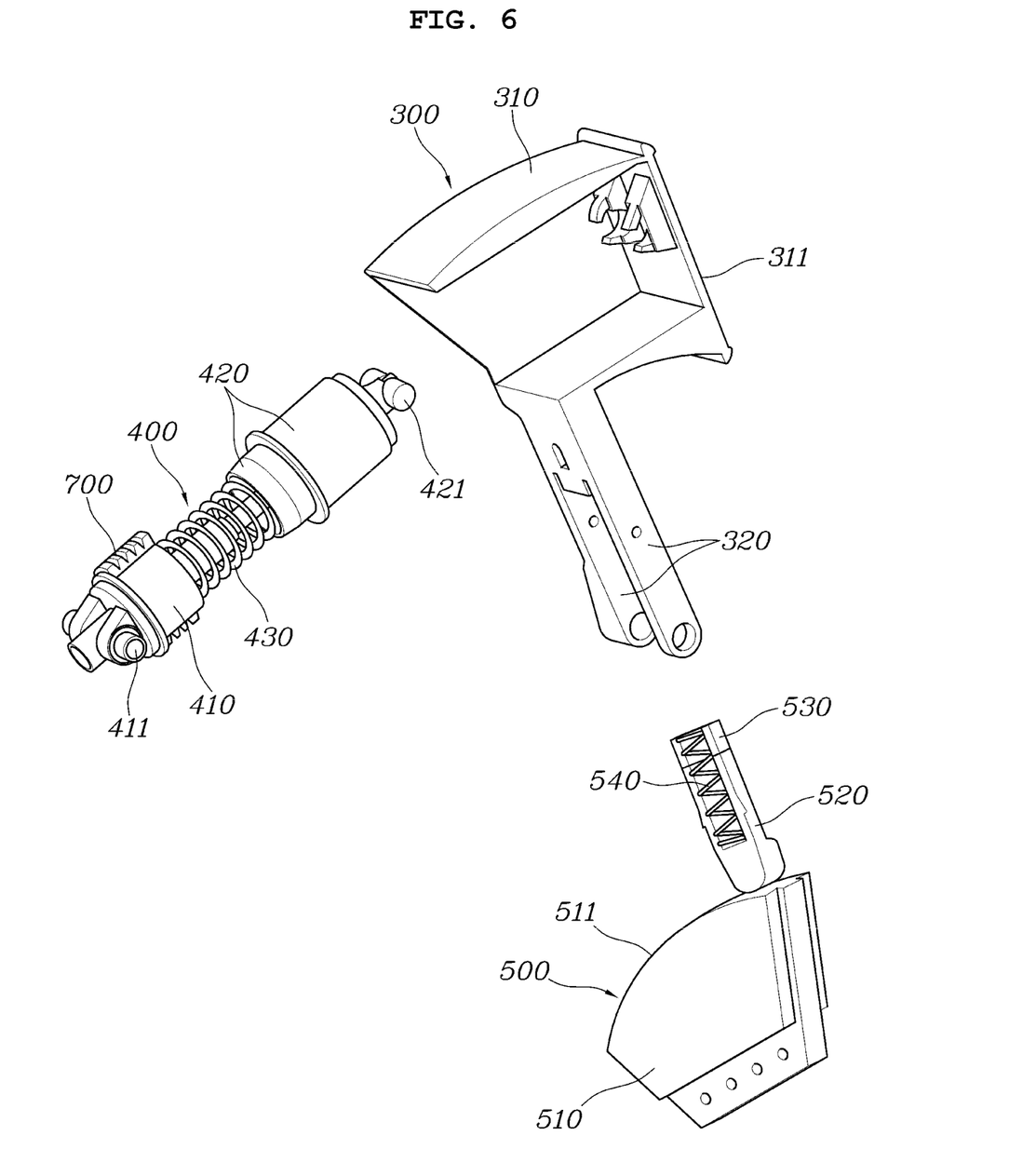
FIG. 6 is an exploded perspective view of the pedal pad, a high-load spring module and a hysteresis module according to one form of the present disclosure.
Figure 7:
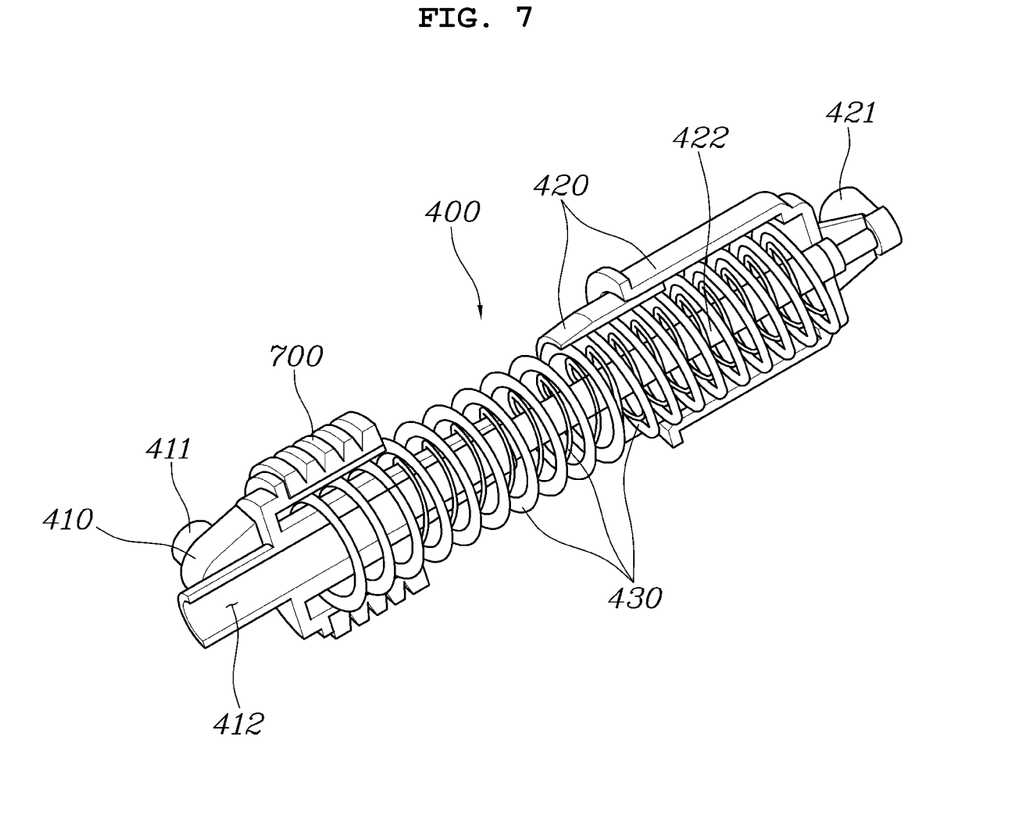
FIG. 7 is a view of the high-load spring module according to another form of the present disclosure.
Figure 8A:
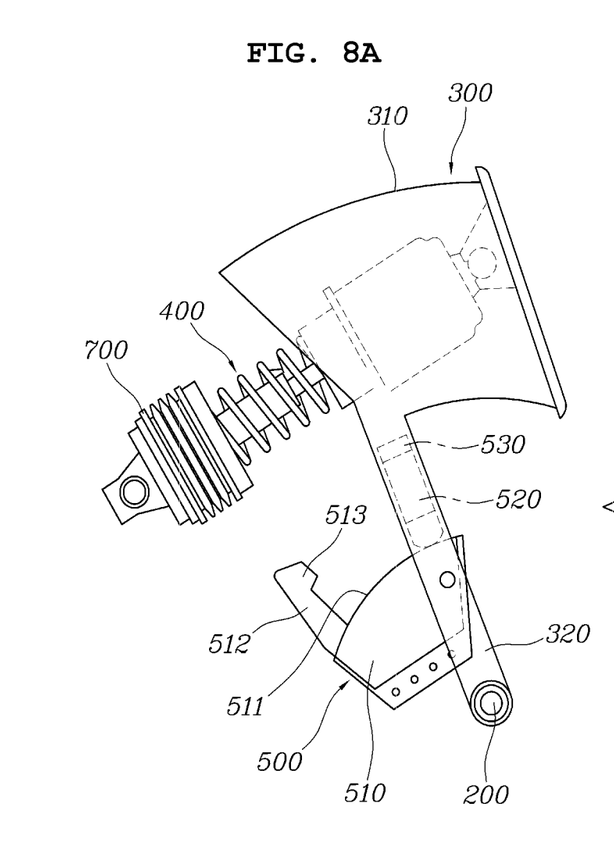
FIG. 8A shows a state in which a pedal arm portion and the stroke protrusion are spaced apart from each other as the pedal pad is pivoted backward in one form of the present disclosure.
Figure 8B:
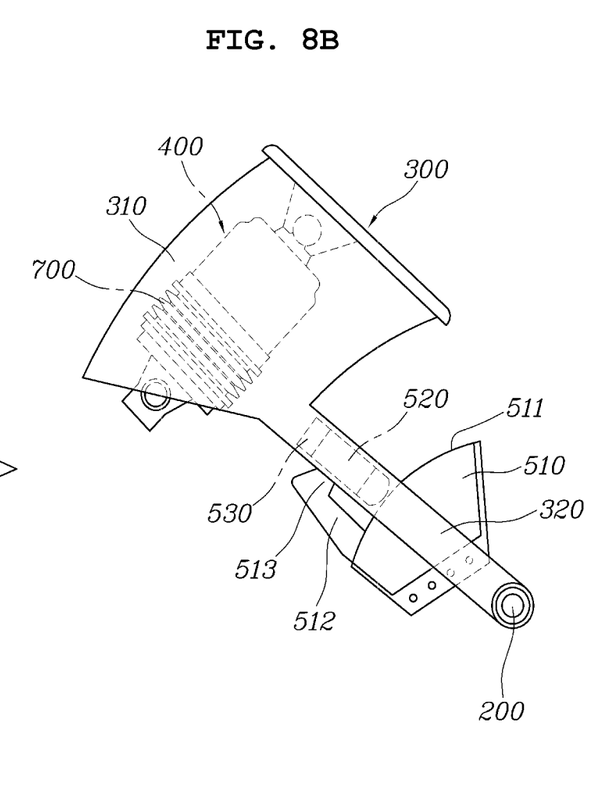
FIG. 8B shows a state in which the pedal arm portion is in contact with the stroke protrusion as the pedal pad is pivoted forward in another form of the present disclosure.

As shown in FIGS. 8A and 8B, in some forms of the present disclosure, the friction member 510 may have a connection protrusion 512 protruding forward and upward from the forward end of the friction surface 511, and the connection protrusion 512 may have a stroke protrusion 513.

The stroke protrusion 513 may regulate the stroke of the pedal pad 300 as the pedal pad 300 is pivoted forward centered on the hinge pin 200 by the driver's operation, and the pedal arm portion 320 pivoted forward is brought into contact with the stroke protrusion 513.

When regulating the stroke of the pedal pad 300 using the stroke protrusion 513, it is possible not to use the stroke damper 700 coupled to the high-load spring module 400 as needed, thereby reducing the cost.

The organ type brake pedal apparatus according to one form of the present disclosure may include the high-load spring module 400 and the hysteresis module 500, and may appropriately tune the pedal effort, desired differently for each vehicle model, by changing the high-load spring 430, the shape of the friction surface 511 of the friction member 510, the hardness of the hysteresis damper 530 or the hysteresis spring 540, if desired.

In another form, the organ type brake pedal apparatus may appropriately tune the pedal hysteresis operation force desired differently for each vehicle model by changing the shape of the friction surface 511 of the friction member 510, the hardness of the hysteresis damper 530 or the hysteresis spring 540.

In other form, the organ type brake pedal apparatus may appropriately tune the pedal stroke desired differently for each vehicle model by changing the stroke damper 700 if desired.

The organ type electronic brake pedal apparatus according to one form of the present disclosure may include the high-load spring module and the hysteresis module, and may appropriately tune the pedal effort, desired differently for each vehicle model, by changing the high-load spring, the shape of the friction surface of the friction member, the hardness of the hysteresis damper or the hysteresis spring, if desired.

In addition, the organ type electronic brake pedal apparatus may appropriately tune the pedal hysteresis operation force desired differently for each vehicle model by changing the shape of the friction surface of the friction member, the hardness of the hysteresis damper or the hysteresis spring.

In one form, the organ type electronic brake pedal apparatus may appropriately tune the pedal stroke desired differently for each vehicle model by changing the stroke damper if desired.

Although the present disclosure has been shown and described with respect to the exemplary forms, it is apparent to those having ordinary skill in the art that the present disclosure may be variously modified and altered without departing from the spirit and scope of the present disclosure.

What is claimed is:

1. An organ electronic brake pedal apparatus comprising:
   a pedal housing configured to be fixedly installed on a floor of a vehicle;
   a pedal pad pivotably coupled to the pedal housing by a hinge pin in forward and backward directions, and configured to be operated by a driver of the vehicle, wherein the pedal pad includes:
     a box-shaped pad portion having a pad surface operated by the driver, and pivotably coupled to a first end of a spring module; and
     a pedal arm portion including: an upper end connected to the pad portion, and a lower end coupled to the hinge pin;
   the spring module further includes a second end pivotably coupled to the pedal housing; and
   a hysteresis module configured to connect the pedal housing and the pedal pad and generate hysteresis when the pedal pad is operated by the driver, wherein the hysteresis module includes:
     a friction rod and a hysteresis spring disposed within the pedal arm portion.

2. The organ electronic brake pedal apparatus of claim 1, further comprising: a plurality of pedal sensors fixedly installed in the pedal housing, connected to the pedal pad, and configured to each generate a signal related to vehicle braking when the pedal pad is pivoted.

3. The organ electronic brake pedal apparatus of claim 1, further comprising: a pedal sensor connected to the pedal arm portion.

4. The organ electronic brake pedal apparatus of claim 3, wherein the box-shaped pad portion includes an opening open in a forward direction, and the first end of the spring module is inserted through the opening of the box-shaped pad portion.

5. The organ electronic brake pedal apparatus of claim 3, wherein a sensor pin is coupled to the pedal arm portion above the hinge pin, and coupled to a sensor lever of the pedal sensor.

6. The organ electronic brake pedal apparatus of claim 3, wherein the pad portion is configured to pass through a housing hole formed in the pedal housing to be inserted into or protrude from the pedal housing as the pedal pad is pivoted; and
   the pedal arm portion is always positioned in the pedal housing whether or not the pedal pad is pivoted.

7. The organ electronic brake pedal apparatus of claim 1, further comprising: a stroke damper positioned on the spring module, and configured to regulate a stroke of the pedal pad when the spring module is compressed as the pedal pad is pivoted forward.

8. The organ electronic brake pedal apparatus of claim 1, wherein the spring module includes:
   a housing connection portion pivotably coupled to the pedal housing;
   a pad connection portion pivotably coupled to the pedal pad and moved together with the pedal pad; and
   a plurality of springs configured to: connect the housing connection portion and the pad connection portion with each other, and generate a pedal effort while being compressed when the pad connection portion is moved toward the housing connection portion.

9. The organ electronic brake pedal apparatus of claim 8, further comprising: a stroke damper configured to be coupled to and surround the housing connection portion, and regulate a stroke of the pedal pad by being brought into contact with the pad connection portion when the pad connection portion is moved toward the housing connection portion while compressing the plurality of springs as the pedal pad is pivoted forward.

10. The organ electronic brake pedal apparatus of claim 1, wherein the hysteresis module includes:
    a friction member fixed in the pedal housing and having a friction surface on a top end thereof;
    the friction rod has a lower end in contact with the friction surface of the friction member and moved along the friction surface in a state of being in contact with the friction surface when the pedal pad is pivoted;
    a hysteresis damper fixed to the pedal pad; and
    the hysteresis spring has a first end and a second end installed to be respectively supported by the friction rod and the hysteresis damper.

11. The organ electronic brake pedal apparatus of claim 10, wherein the friction surface is formed as a curved surface having an arc trajectory in the forward and backward directions, a backward end of the friction surface having the same trajectory as a pivoted radius centered on the hinge pin, and the arc trajectory of the friction surface being gradually greater than the pivoted radius, from the backward end of the friction surface toward a forward end thereof.

12. The organ electronic brake pedal apparatus of claim 10, wherein the friction rod is formed by plastic injection and is in frictional contact with the friction surface.

13. The organ electronic brake pedal apparatus of claim 10, wherein the friction rod, the hysteresis damper and the hysteresis spring are connected in series with one another.

14. The organ electronic brake pedal apparatus of claim 10, wherein the friction member has a connection protrusion protruding forward and upward from a forward end of the friction surface; and
    the connection protrusion has a stroke protrusion regulating a stroke of the pedal pad by being brought into contact with the pedal pad when pivoted forward.

* * * * *